United States Patent [19]
Stay et al.

[11] 3,854,044
[45] Dec. 10, 1974

[54] METHOD AND APPARATUS FOR MEASURING A TRANSMISSION SPECTRUM OF A FILM

[75] Inventors: Bernard John Stay, St. Albans; Harry Arthur Willis, Welwyn Garden City, both of England

[73] Assignee: Imperial Chemical Industries Limited, London, England

[22] Filed: Mar. 12, 1973

[21] Appl. No.: 339,767

[30] Foreign Application Priority Data
Mar. 14, 1972  Great Britain.................. 11767/72

[52] U.S. Cl................................. 250/338, 250/339
[51] Int. Cl............................................. G01j 3/00
[58] Field of Search............ 250/338, 339, 349, 336

[56] References Cited
UNITED STATES PATENTS

| | | | |
|---|---|---|---|
| 3,017,512 | 1/1962 | Wolbert............................. | 250/349 |
| 3,405,268 | 10/1968 | Brunton............................. | 250/339 |
| 3,426,201 | 2/1969 | Hilton et al........................ | 250/338 |
| 3,451,254 | 6/1969 | Maley................................ | 250/339 X |

Primary Examiner—Archie R. Borchelt
Attorney, Agent, or Firm—Cushman, Darby & Cushman

[57] ABSTRACT

A method for measuring a transmission spectrum of a film having a thickness which is of a similar order of magnitude to the wavelengths of the radiation used in the measurements, comprises directing the radiation onto the film thereby dividing the radiation into a transmitted beam and a returned beam, each beam individually having interference fringes caused by internal reflection within the film, and measuring at said wavelengths the total intensity of substantially all of both of the beams or substantially equal portions thereof, so as to mutually cancel the intensity variations with wavelength due to the interference fringes of the individual beams.

The method enables precise measurements to be made because a narrow band width can be used without producing the interference errors previously associated with high resolution measurements of absorption by thin films.

15 Claims, 6 Drawing Figures

METHOD AND APPARATUS FOR MEASURING A TRANSMISSION SPECTRUM OF A FILM

The invention relates to a method and apparatus for measuring the transmission spectra of films which are self supporting or which are supported on transparent substrates, being films having a thickness which is of a similar order of magnitude to that of the wavelength of the radiation used.

Measurement of the absorption of radiation in transmission spectra is a useful tool for both qualitative and quantative analysis of a material, especially in the infrared region. However, for parallel sided specular-surfaced films, the transmitted beam consists of radiation which has passed through the film unreflected and further radiation which has been internally reflected two or more times before leaving the film as part of the transmitted beam. Thin films, especially thermoplastic films and coatings on them, may have substantially specular surfaces, so that when the measuring radiation has a wavelength of a similar order of magnitude as the thickness of the film, there will be interference between that portion of the transmitted beam which is transmitted without internal reflection and those portions which are internally reflected. The interference gives rise to a fringe pattern superimposed on the spectrum, an example of which is illustrated hereinafter in FIG. 5. The fringes may require sensitive apparatus to detect them, but for many applications such sensitivity is essential (e.g., in the measurement of the peaks between 4,000 and 4,500 cm$^{-1}$ of the spectrum illustrated in FIGS. 4 and 5), and for such conditions the fringes must clearly be avoided or removed for accurate measurements to be made.

Various techniques can be used to overcome the problem, such as the use of an immersion oil or the destruction of the specular surfaces by abrasion, but such techniques are not suitable for in-line measurement, e.g., of thickness, during film production. It has been suggested in U.S. Pat. Specification No. 3,631,526 that fringes may be eliminated by using a broad spectrum of incidence angle, by using measuring and reference beams of relatively close wavelengths, or by using measuring radiation having a broad band width. However, while reducing the fringes, these methods are mechanically inconvenient and/or tend also to reduce the precision.

Radiation which strikes parallel sided film is divided into a transmitted beam composed of radiation transmitted without any reflection together with radiation which has been internally reflected an even number of times, and a returned beam composed of radiation reflected at the incident face and radiation internally reflected an odd number of times. We have now found that although the returned beam usually has a much lower intensity than the transmitted beam, the intensities of the fringes in the two beams are substantially the same, and also that the fringe maxima in the transmitted beam coincide with the fringe minima in the returned beam. We have applied our discoveries to overcoming the problem of the fringes which have hitherto made measurements very difficult to obtain with high precision.

Accordingly, we now provide a method for measuring a transmission spectrum of a film having a thickness which is of a similar order of magnitude to the wavelengths of the radiation used in the measurement, which method comprises directing the radiation onto the film thereby dividing the radiation into a transmitted beam and a returned beam, each beam individually having interference fringes caused by internal reflection within the film, and measuring at said wavelengths the total intensity of substantially all of both of the beams or substantially equal portions thereof, so as to mutually cancel the intensity variations with wavelength due to the interference fringes of the individual beams.

The present method in its simplest form comprises separately detecting and measuring the intensities of the two beams and combining the measurements to provide the required spectrum. However, although the principle of this method is simple, in practice we found it more convenient to use a method which comprises combining substantially all of both the transmitted and returned beams or substantially equal portions thereof and measuring the intensity of the combined beams.

Suitable apparatus comprises a source of radiation, means for providing a sufficiently narrow bandwidth to produce interference fringes in both returned and transmitted beams taken individually, means for detecting the radiation, means for directing all of both of the beams or substantially equal portions thereof to the detecting means, and means for measuring the total output from the detecting means.

In all the possible forms of apparatus, we prefer that all reflecting surfaces (if any) of the means directing the beams to the detecting means, are specular reflectors. By the use of such reflectors, scattering of the beams may be minimised.

Our preferred apparatus comprises means for directing substantially all of both the transmitted and returned beams or substantially equal portions thereof to a common detector, whereby the output from the detector represents the sum of the intensities of the two beams or their portions respectively.

Since the method requires all the intensity of both beams or substantially equal portions thereof to be measured, it is important to be able to accurately align the beams with the detecting means. Where the two beams follow completely different paths to the same or different detectors, alignment becomes more difficult. Apparatus having an optical system which may readily be aligned is one having on one side of the film or path thereof the common detector aligned to receive one of the beams or portion thereof, and on the other side of the film or path thereof a specular reflector aligned to direct the other beam or portion thereof through the film to the detector. The detector may then be positioned where most convenient since once the beams are both on the same side of the film, they may be made to take substantially the same paths using common reflecting means to direct them to the detector, as required.

In most situations, the fringes of the returned beam will retain substantially the same intensity as the fringes of the transmitted beam. However, where for any reason the fringes of either beams are reduced in intensity on leaving the film, e.g., by having to pass through an attenuating substrate supporting the film, the fringes of the other beam may not be completely cancelled. Where differences in the intensities of the fringes are likely to occur, we therefore prefer to separate the paths of the two beams, and to provide means for reducing the intensity of the beam having the more intense fringes by positioning an attenuator in its path.

For measuring the absorption at a particular wavelength, it is preferable to measure the ratio of the intensity of the absorbed wavelength with that of a substantially unabsorbed wavelength, so to avoid the effect of source intensity fluctuations with time. This may be carried out by using a filter disc rotating in front of a single radiation source and hence producing sequential bursts of energy at the two wavelengths, in known manner.

In the present apparatus, the radiation reflected from the surfaces of the film is measured, and so the film must be maintained in a predetermined position as it passes through the apparatus. The film may for example be simply held taut, stretched between two pairs of nip rolls. However, we prefer, especially with a moving film, to support the film directly by passing it over supporting means located immediately under the part of the film being viewed. The supporting means may be transparent when the transmitted beam is measured directly, but when reflecting the transmitted beam back through the film to a common detector, we find that the reflector may very conveniently be used to support the film. It is most convenient to have a supporting means which has a convex curvature about an axis perpendicular to the direction of motion of the film so that the film may more readily be maintained in contact with the supporting means as it runs over it.

We have found that a stationary supporting means does enable the apparatus to be very accurately aligned, but for in-line monitoring during the production of film where it is important that the surface of the film should not be damaged, we prefer to use as supporting means a roller, especially an opaque polished roller forming a reflector, which may rotate in synchronism with the movement of the film contacting its surface. The roller may be freely rotating so that it is driven by the film, especially when the film is held in contact with the roller by a further roller biased against the reflector to provide a nip. Alternatively, means for transporting the film through the apparatus may be coupled to the roller so that the peripheral speed of the roller may be maintained substantially equal to the speed of the film during operation.

The apparatus may be used for measuring the transmission spectra of unsupported films, especially the spectra of thermoplastic films such as those sold by Imperial Chemical Industries Limited under the names "Propafilm" or "Melinex." (Films sold under the names "Propafilm" and "Melinex" are respectively films based on polypropylene and polyethylene terephthalate). Alternatively, the film may be part of a laminate, or form a coating on a second film providing a transparent substrate. For example the coating may be an anchor coat for securing a topcoat to the substrate film, or it may be a topcoat itself, such as a vinylidene chloride copolymer film applied to the transparent substrate film to provide a vapour barrier, to improve heat sealing properties or to improve print retention. Similarly the film may be one or more layers of a laminate formed by co-extruding different polymers.

The measurements of the transmission spectrum may be used quantitatively for determining the thickness of films having known composition, or for determining the composition of films of known thickness. Both these results may be obtained by selecting the appropriate absorption bands and comparing the intensities obtained with a reference intensity. The spectral measurements may also be used for example to detect impurities, moisture content or residual monomers. All these determinations may be obtained without affecting the rate or quality of production, and furthermore, the results obtained may be fed back to the process control means so that various parameters, such as thickness, may be monitored and controlled during production.

To illustrate the invention, the following descriptions of specific embodiments and experimental results obtained using such embodiments, are provided by way of example, reference being made to the drawings in which.

Figure 1:
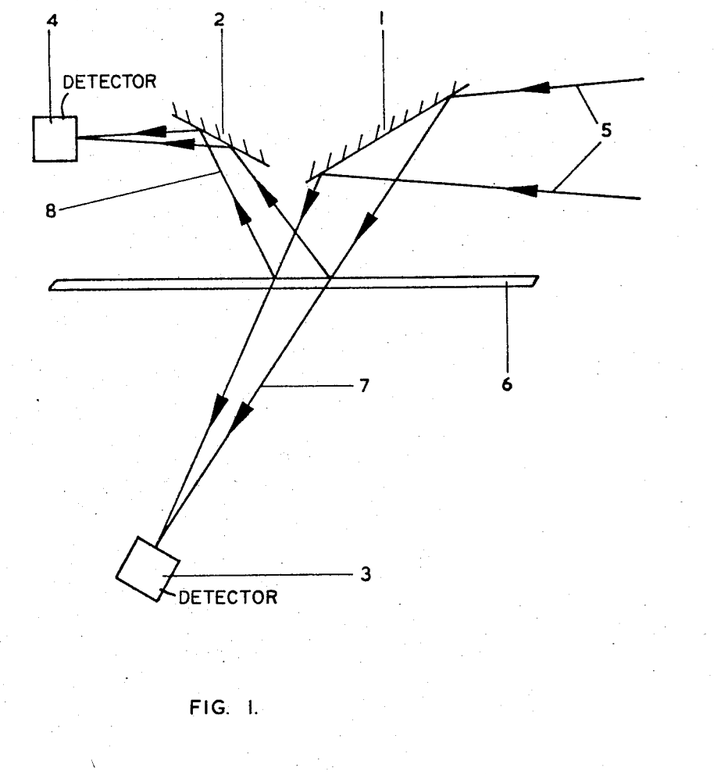
FIGS. 1 to 3 are schematic representations of three different forms of the apparatus which may be aligned so as to avoid fringes by the present method.

The apparatus illustrated in FIG. 1 comprises first and second mirrors 1, 2, a source of infra red radiation (not shown) and two detectors 3, 4. To use the apparatus for measuring the infra red spectrum of a parallel-sided specular-surfaced thin film, infra red radiation 5 is directed from the source on to the first mirror 1 so that it is all reflected to one of the detectors 3. The film 6 to be tested is then inserted between the first mirror 1 and the detector 3, and the incident radiation will thereby be split by the film into a transmitted beam 7 and a returned beam 8. The film 6 and second mirror 2 are aligned so that the returned beam is directed on to the second mirror and thence to the other detector 4. It is preferable that the parts of the apparatus be carefully aligned so as to direct all of both transmitted and returned beams to their respective detectors. Although in theory, it is sufficient if equal portions of the two beams are directed to their detectors, with this apparatus it is very difficult in practice to arrange for an equal cut off to be applied to each beam, and furthermore by losing part of the beams, the measurable intensity is thereby reduced. The outputs from the two detectors are added to give the measure of the absorption. However, for measuring coatings on neutrally absorbing substrates of sufficiently different refractive index for fringes to arise from reflections at the interface, this apparatus is particularly useful in that it enables the returned beams to be attenuated by an amount equal to the attenuation of the transmitted beam by the substrate, by introducing a suitable attenuator into the beam before it reaches the detector. Where the returned beam has a cross-section equal to that of the transmitted beam where the latter passes through the substrate, a convenient attenuator may be a piece of the substrate. This may be readily achieved with this apparatus, because of the different paths along which the two beams travel after leaving the film.

Figure 2:
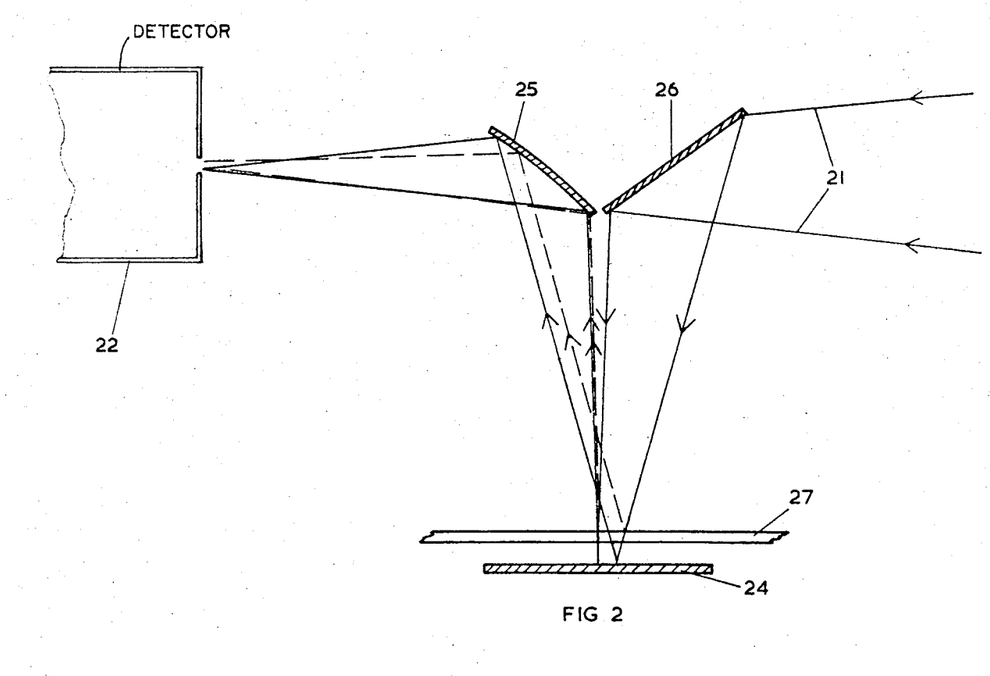

For spectral analysis, a broad band width source may be used and the radiation analysed by means of monochromators placed before the detectors (but this is generally easier to do when using only a single detector as shown in FIG. 2). Alternatively, for thickness measurement or quantitative determination of impurities in the film, absorption and reference wave bands of the radiation may be selected at the source. This may be achieved in known manner by using a rotatable filter disc which divides the radiation into discrete pulses at the absorbing and reference wavelengths alternatively.

FIG. 2 shows the entrance optics of a spectrometer which we have produced by modifying a known spectrometer to operate in the manner of the present invention. The apparatus illustrated has a single detector 22 and three specular reflectors 24, 25, 26 arranged so that a convergent beam 21 from a source (not shown) when directed onto the first mirror 26 is reflected on to the second mirror 24, and thence on to the third mirror 25 to be finally focused onto the detector. In use, the sample film 27 is placed above the second mirror 24 substantially as shown, being oriented so that radiation reflected at its incident surface is directed to the detector. With the film in place, the returned beam and the transmitted beam are directed to the same detector.

In its original known form, the spectrometer from which that of FIG. 2 was produced, did not have the mirrors 24, 25, 26, and was arranged for the specimen to be held where the first and third mirrors 26, 25 are shown in FIG. 2. The detector therefore received only the transmitted beam. Both in its original form and in its now modified form, the spectrometer of FIG. 2 may be used qualitatively by using a source having a broad radiation band width, and analysing the spectrum by a monochromator before the detector, or it may be used to measure the absorption at selected frequencies by chopping the radiation into sequential pulses at the desired wavebands, the pulses then being directed to a common detector via the sample film. As with the previous embodiment, the absorption is then determined by comparing the intensities of the absorbed and non-absorbed wavebands.

Figure 3:
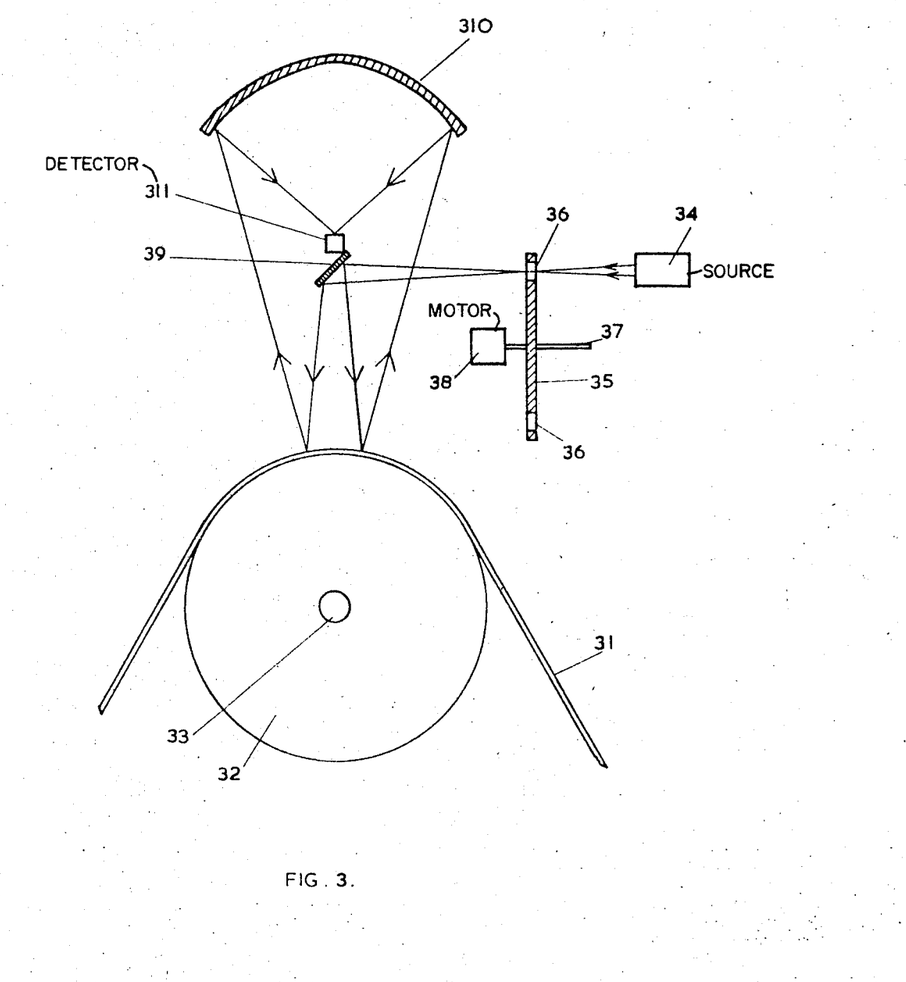

The third apparatus shown in FIG. 3 comprises a source 34, a beam chopper 35, a first specular reflector 39, a roller 32 having a polished outer surface and mounted so as to rotate about axial bearings 33, a concave specular reflector 310 and a detector 311. The beam chopper 35 comprises a disc rotatable in front of the radiation source 34 about a perpendicular axis 37 by a synchronous motor 38. In the disc are two circular holes 36 containing filters which are located equidistant from the axis so that both follow the same path as the disc rotates, the filters transmitting radiation at the reference and absorbed wavelengths respectively.

The source, chopper, detector and reflectors 39, 310, are housed in a single case, forming a commercially available instrument sold for measuring moisture content in papers, textiles and particulate solids such as tobacco, clay and the like, by directing radiation of a selected wavelength onto the surface of the sample and measuring the radiation reflected from the sample. The percentage reflectance at selected wavebands provides a measure of the moisture content of the materials, and no means is provided to reflect any radiation which may pass through the sample back towards the reflector.

In the present apparatus illustrated in FIG. 3, the instrument is securely mounted above the roller and aligned so that radiation from the source 34 which is reflected downwards by the reflector 39, is reflected back from the surface of the roller to be directed to the detector 311 by reflector 310. To achieve this alignment, the roller preferably has a large diameter, and the position of the concave reflector 10 and the roller are adjusted to give the maximum signal from the detector. To measure the absorption by a film, the film 31 is held taut over the surface of the roller, so that the two surfaces of the film are parallel to the surface of the roller. Hence when the radiation is divided by the film into returned and transmitted beams, the transmitted beam is reflected back through the film by the roller along substantially the same path as that taken by the returned beam. By focussing the radiation travelling along that common path onto the detector, substantially all of both beams or substantially equal portions of them will reach the detector and so mutually cancel the intensity variations in the individual beams due to the interference.

The following examples are provided to show the significant improvement in the precision which may be achieved in practice by using the present method.

EXAMPLE 1

Using apparatus of FIG. 2 to measure the absorption of a polystyrene film having a thickness of about 30 μm, over a broad spectrum of wavebands, a broad band infra red source was used in conjunction with a combined monochromator/detector to analyse the resultant spectrum. The transmitted beam was reflected back through the film to be combined with the radiation of the returned beam, the combined beams being then directed to the detector where the total intensity was measured. The spectrum obtained is shown in FIG. 4.

EXAMPLE 2

In the apparatus of FIG. 2, the mirrors were removed so that the radiation went directly from the source to the detector, this being the form in which this particular spectrometer was previously known. The sample film was then placed between the source and the detector so as to orthogonally intercept the radiation. The resultant spectrum we obtained is shown in FIG. 5.

Figure 4:
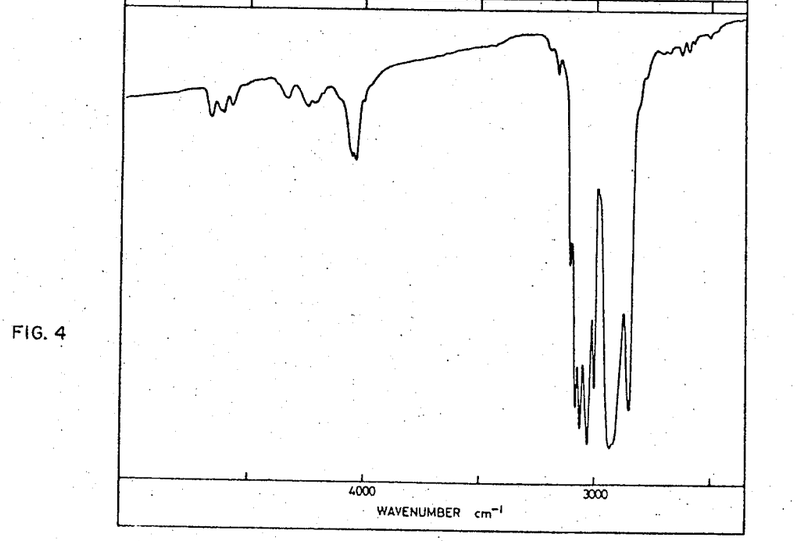
FIG. 4 is a part of the transmission spectrum of polystyrene film obtained using apparatus as illustrated in FIG. 2.
Figure 5:
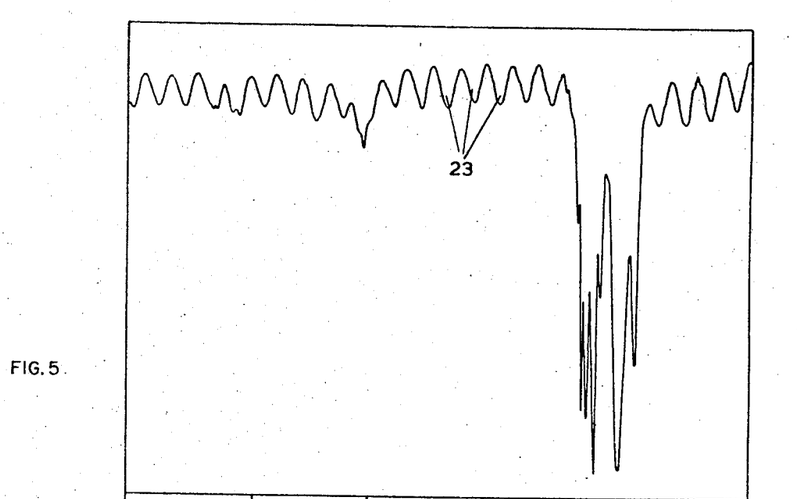
FIG. 5 is a spectrum equivalent to that shown in FIG. 4, but obtained by passing a film between a source aligned directly with a detector.

It will be seen by comparing FIGS. 4 and 5, that the spectrum obtained by measuring only the transmitted radiation had a clear fringe pattern which was avoided by adding the returned beam to the transmitted beam according to the method of the present invention before measuring the intensity of the radiation by the detector.

EXAMPLES 3 and 4

These examples both relate to measurements of film thickness, the alignment of the apparatus being disturbed in the first example so as to demonstrate experimentally what happens when the fringes are not fully cancelled. The apparatus used comprised means for holding a sample of the film above a mirror as illustrated in FIG. 2, using the commercial instrument of FIG. 3 to provide and detect the radiation. In these examples the mirror 24 was aligned with respect to the instrument so that the radiation from the source was directed on to the mirror 24, which then reflected it towards the detector through the instrument's optical system. The mirror 24 and the remainder of the optics were then moved to focus the radiation onto the detector, i.e., until the maximum signal was being recorded. The various parts of the apparatus were then secured in position to preserve their spacial arrangement.

The film being examined was a polypropylene film, various samples being examined, the samples having differing thicknesses previously determined using proven interfermetric techniques. Polypropylene film absorbs in the near infra red at 2.36 $\mu$m and shows very little absorption at the neighbouring wavelength of 2.00 $\mu$m. The infra red radiation was produced by a tungsten-halogen source within a quartz envelope, and was then passed through a rotating disc chopper containing two filters for transmitting only radiation at the measuring and reference wavelengths, the filters being equally disposed about the axis of rotation. These filters which were of the multi-layer interference type, selected the two wavebands 2.36 ± 0.01 $\mu$m and 2.00 ± 0.01 $\mu$m each with a band width at half maximum transmission of 11 percent of the wavelength.

Figure 6:
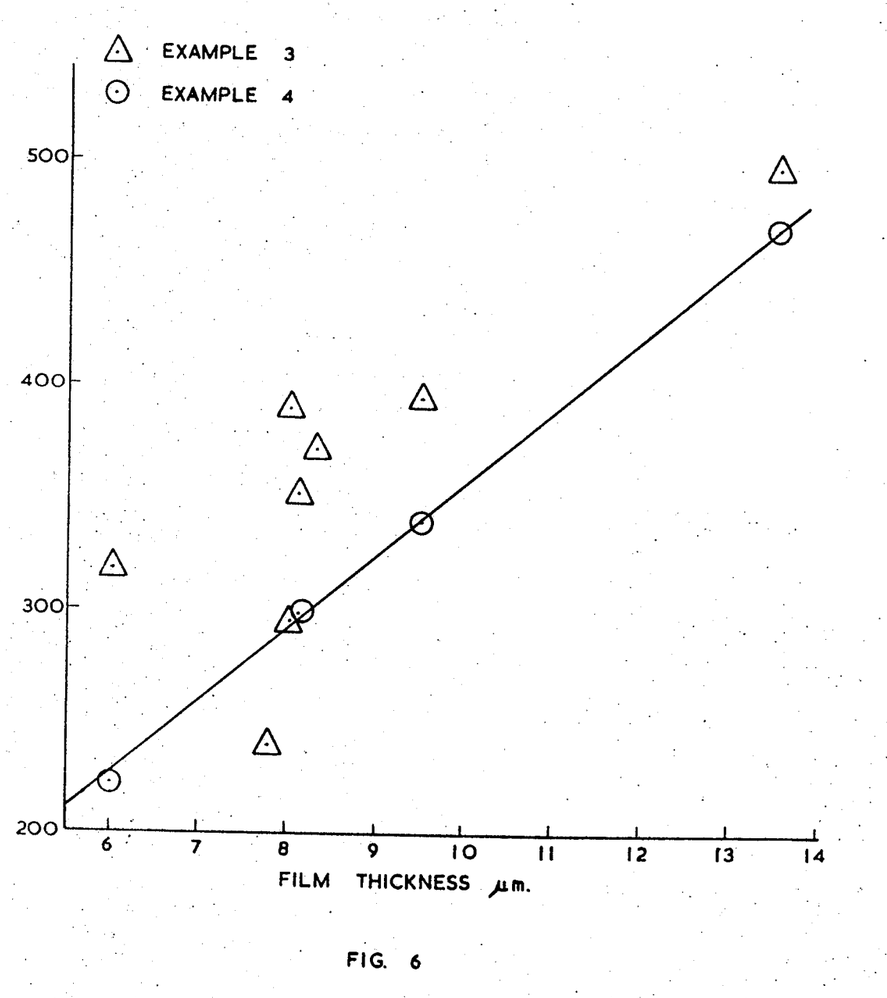
FIG. 6 is a graphical representation of experimental results obtained when measuring the thickness of polypropylene film.

In Example 3 the samples of film were all held firmly in a frame above the mirror, but they were all tilted (by a constant amount) so that the returned beam did not reach the detector. The results obtained are shown in the table below, and graphically in FIG. 6. It will be seen that the fringes of the transmitted beam which were not cancelled by those of the returned beam, caused considerable error in the thickness determined.

In Example 4 the mirror and film were aligned so that the transmitted and returned beams were directed together to the detector. It will be seen from the results recorded in the table below and also in their graphical representation in FIG. 6, that the scatter was thereby almost completely eliminated. Such reliability of results could not have been achieved without the removal of the fringes.

TABLE OF RESULTS FROM EXAMPLES 3 and 4

| Thickness $\mu$m | Detector Meter Readings | |
|---|---|---|
| | Example 3 | Example 4 |
| 6.0 | 318 | 222 |
| 7.8 | 240 | — |
| 8.0 | 295 | — |
| 8.0 (repeat) | 390 | — |
| 8.1 | 352 | 298 |
| 8.3 | 372 | — |
| 9.5 | 395 | 340 |
| 13.5 | 498 | 470 |

As a further experiment using the apparatus of Example 4, we placed a diffuser plate between the film and the mirror so that only part of the transmitted beam would be directed to the detector. The purpose of this experiment was to show that if the full intensity of the fringe pattern in the returned beam was directed to the detector together with only a fraction of the intensity of the transmitted beam fringe pattern, the uncancelled portion of the returned beam fringes would cause errors in a similar manner to those of Example 3. As expected, the apparatus did not give consistant results, and as occurred with the apparatus of Example 3, the scatter in the results was too large for them to be used as an accurate measure of the thickness. Indeed the scatter was considerably worse than that obtained in Example 3, but this increased scatter may have been at least partly due to the reduced sensitivity which occurred due to the attenuation of the transmitted beam.

We claim:

1. A method for measuring a transmission spectrum of a film having a thickness which is of a similar order of magnitude to the wavelengths of the radiation used in the measurement, which method comprises directing the radiation onto the film thereby dividing the radiation into a transmitted beam and a returned beam, each beam individually having interference fringes caused by internal reflection within the film, and measuring at said wavelengths the total intensity of at least substantially equal portions of both of said beams, so as to mutually cancel the intensity variations with wavelength due to the interference fringes of the individual beams.

2. A method according to claim 1 which comprises separately detecting and measuring the intensities of the two beams, and combining the measurements to provide the required measurement.

3. A method according to claim 1 which comprises combining at least substantially equal portions of both the transmitted and returned beams and measuring the intensity of the combined beams.

4. A method according to claim 1 for determining the absorption by the film at selected wavebands, which comprises directing onto the film, at least two wavebands of radiation including one waveband at which absorption is to be measured and a reference waveband at which there is substantially no selective absorption by the film, and measuring at both wavebands the total intensity of at least substantially equal portions of both of the beams, and determining the ratio of the measurements in respect of the absorbed waveband and reference waveband.

5. A method according to claim 1 for measuring during the continuous production of a film, a parameter of the film determined from the transmission spectrum, the method comprising feeding back details of the parameter to means for controlling the parameter during the film production.

6. Apparatus for measuring a transmission spectrum of a film having a thickness which is of a similar order of magnitude to the wavelength of the radiation used in the measurements, which apparatus comprises a source of radiation, means for providing a sufficiently narrow bandwidth to produce interference fringes in both returned and transmitted beams taken individually, means for detecting the radiation, means for directing at least substantially equal portions of both of the beams to the detecting means, and means for measuring the total output from the detecting means.

7. Apparatus according to claim 6 in which all reflecting surfaces of the means directing the beams to the detecting means, are specular reflectors.

8. Apparatus according to claim 6 which comprises means for directing at least substantially equal portions of both the transmitted and returned beams to a common detector, whereby the output from the detector represents the sum of the intensities of the directed beams.

9. Apparatus according to claim 8 having on one side of the film the common detector positioned to receive one of the beams, and on the other side of the film a specular reflector aligned to direct the other beam through the film to the detector.

10. Apparatus according to claim 6 having means for selecting and directing onto the film at least two wavebands of the radiation, including a reference waveband and a waveband at which absorption is to be measured.

11. Apparatus according to claim 10 in which the radiation of each of the wavebands travels along substantially the same paths as that of the other bands, the radiation of different bands being sequentially detected by a common detector.

12. Apparatus according to claim 6 having means for attenuating the intensity of one of the beams whereby the intensity of the fringes of the two beams may be made substantially equal.

13. Apparatus according to claim 6 having means for directly supporting the film immediately under the part of the film being viewed.

14. Apparatus according to claim 13 in which the support means comprises a roller which is rotatable in synchronism with the movement of the film contacting its surface.

15. Apparatus according to claim 6 for measuring during the continuous production of a film, a parameter of the film determinable from the transmission spectrum, the apparatus being adapted to feed back details of the parameter to means for controlling the parameter during the film production.

* * * * *